United States Patent [19]
Devenyi

[11] 3,786,349
[45] Jan. 15, 1974

[54] ELECTRICAL REACTANCE AND LOSS MEASUREMENT APPARATUS AND METHOD

[75] Inventor: Tibor Francis Devenyi, Carp, Ontario, Canada

[73] Assignee: Northern Electric Company Limited, Montreal, Quebec, Canada

[22] Filed: May 3, 1973

[21] Appl. No.: 356,956

[52] U.S. Cl. ............................................. 324/57 R
[51] Int. Cl. ........................................ G01r 27/00
[58] Field of Search ........................ 324/57 R, 57 H

[56] References Cited
UNITED STATES PATENTS

| | | | |
|---|---|---|---|
| 2,891,217 | 6/1959 | Grieg et al. | 324/57 R |
| 3,005,151 | 10/1961 | Ule | 324/57 R |
| 3,243,699 | 3/1966 | Kummer | 324/57 R |

Primary Examiner—Stanley T. Krawczewicz
Attorney—John E. Mowle

[57] ABSTRACT

An instrument, for measuring the electrical reactance and loss characteristics of a sample, includes a means for applying an alternating electrical signal across the sample and deriving therefrom a voltage signal having a phase and magnitude relationship with the electrical signal, according to the reactance and loss characteristics of the element and a means for synchronously rectifying the voltage signal. An integrator produces an integral of the rectified voltage, the value of which is indicative of the value of one of the characteristics. The measurement is obtained at the end of one or more full cycles of the alternating electrical signal. The instrument is operable over a wide range of frequencies, for example from 0.01 Hz to 100 KHz. It is particularly useful at very low frequencies as it provides measurements more quickly than a typical reactance bridge or phase meter.

14 Claims, 2 Drawing Figures

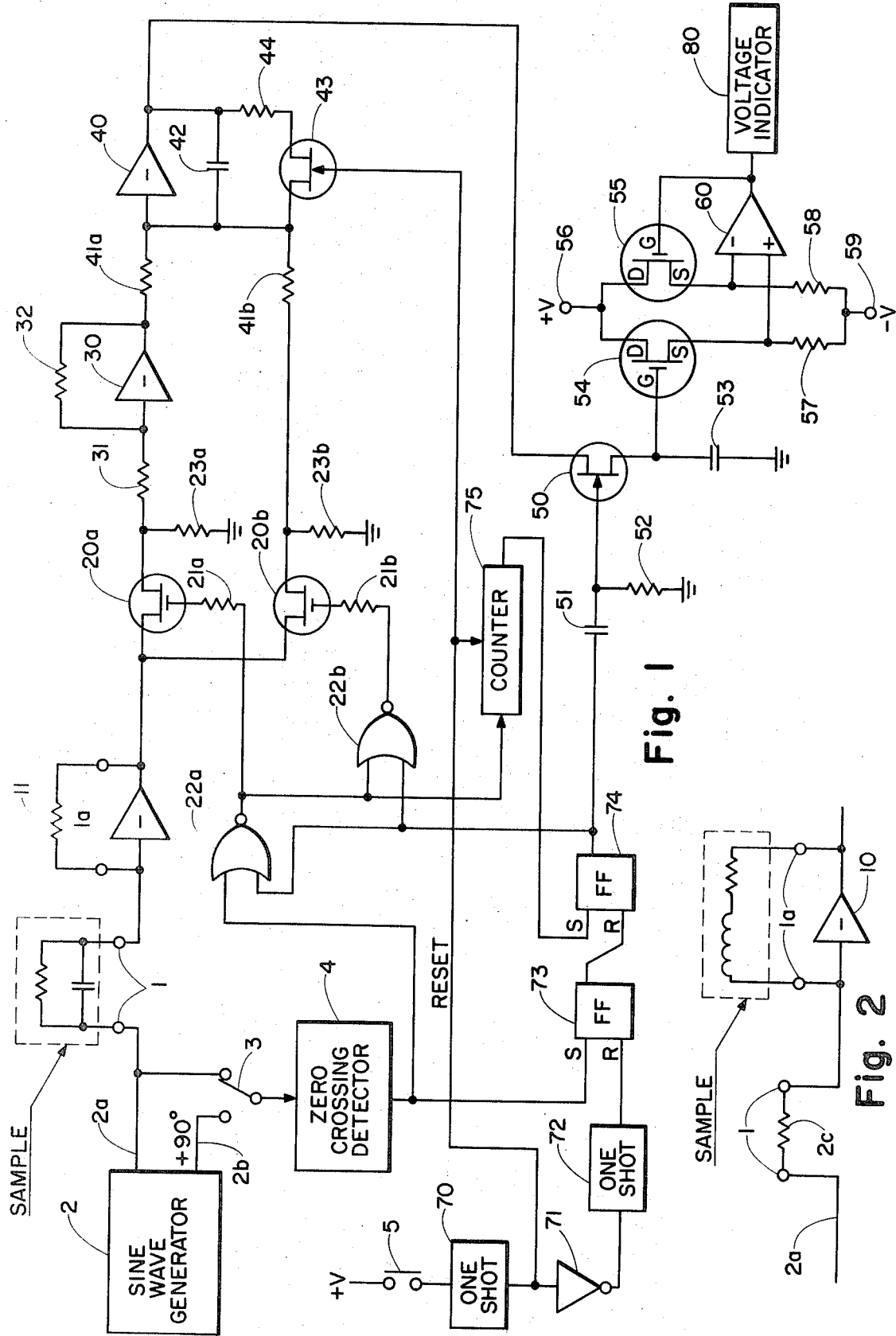

ELECTRICAL REACTANCE AND LOSS MEASUREMENT APPARATUS AND METHOD

The present invention relates to measurement of reactance and particularly to an apparatus and method for providing precision measurements of the capacitance, inductance and loss characteristic of elements, materials and components.

In the measuring of the reactive and loss electrical properties of some materials, for example the capacitance of a metal oxide silicon structure, the evident properties of the material will sometimes vary with the measuring stimulus applied. In the above example a high frequency signal can be used to obtain an indication of the capacitance between the silicon and the metal or a very low frequency signal can be used. The capacitance indication obtained using the high frequency is often substantially different, i.e. typically less, than that obtained using a much lower frequency signal.

A null method, for measuring reactance at low frequencies, is based upon the achievement of a complete balance in a measuring network or bridge circuit such that no current flows through a detector associated therewith. The reactance and conductance of a sample being measured are read off from the values of the corresponding balancing arms of the bridge circuit. One apparatus for measuring at low frequencies is the Harris type bridge. This bridge is described by W.P.Harris in a publication entitled "A New Ultralow Frequency Bridge for Dielectric Measurements" which appeared in the National Academy of Science Annual Report; Conference of Electrical Insulation and Dielectric Phenomena; pp. 72-74, 1966. The approach of the null, whether achieved manually or through some servo mechanism, requires a number of steps, between each of which several cycles of the measuring frequency have to be completed in order to assess the deviation from the null. Consequently this method of measurement becomes very time consuming at low frequencies.

A direct reading method is based upon the measurement of in-phase and out-of-phase components of a reference signal applied across the sample. The current component is usually determined by measuring the voltage developed across a small resistance inserted in series with the sample, such that neither the magnitude not the phase of the current going through the sample is altered appreciably. The current through the sample, due to its conductance and reactance, is determined using a phase detector, synchronized with a reference signal taken from the signal source, typically a sinewave generator.

A conventional phase detector consists of a synchronous rectifier followed by a low pass filter whose output is recorded by a (d.c.) detector. The rectifier is driven by the reference signal. The time constant of the filter-detector combination must be long enough to remove most of the a.c. signal resulting from the synchronous rectification. Consequently the time constant of the filter has to be large compared to the cycle length or period of the signal, which again results in time consuming measurements at low frequencies. Also, a conventional phase detector type of capacitance measuring instrument produces an output voltage which is proportional to the frequency multiplied by the capacitance ($\omega C$) and loss conductance (G). Since quantities describing the electrical and physical properties of a capacitor are C — the capacitance and $G/\omega$ — the lose during one cycle of the applied voltage, both above quantities have to be divided by $\omega$ to arrive at a meaningful measurement. The inclusion of $\omega$ in the output voltage of a conventional phase detector capacitance meter requires the accurate knowledge of the frequency itself. An uncertainty in $\omega$ will cause an equal error in C and $G/\omega$.

The present invention provides an apparatus and method which is capable of yielding a precise indication of reactance or loss independent of frequency ($\omega$) after as little as one full cycle of an alternating signal applied to the sample or element. Also a user may plot reactance and loss with respect to frequency solely by adjusting the frequency of the alternating signal.

The present invention also provides an apparatus useful as a phase sensitive meter for providing an indication of the in phase and quadrature phase vector magnitudes in an unknown alternating electrical signal.

The present invention is an apparatus for providing an indication of the electrical reactance and loss characteristics of an element. The apparatus comprises a means for applying an alternating electrical signal to the element, and deriving therefrom a voltage signal having a phase and magnitude relationship with respect to the alternating electrical signal, according to the reactance and loss characteristics of the element. A means for rectifying the signal voltage is synchronized with the alternating electrical signal. A means for integrating the rectified voltage, during th period of one full cycle of the alternating electrical signal, provides an integrated voltage at the end of the period, the magnitude of which is indicative of one of the characteristics.

The present invention is also a method for obtaining an indication of the electrical reactance and loss characteristics of an element, comprising the steps of applying an alternating electrical signal to the element and deriving therefrom a voltage signal, having a magnitude and phase relationship with the alternating electrical signal according to the reactance and loss characteristics of the element. The voltage signal is rectified in synchronism with the alternating electrical signal. The rectified voltage signal is integrated during the period of one full cycle of the alternating voltage, the integral at the end of the period being an indication of one of said characteristics.

An example embodiment will now be described with reference to the accompanying drawings in which:

FIG. 1 is a block and schematic drawing of a reactance and loss measurement apparatus, adapted to the measurement of capacitive reactance and loss, in accordance with the invention;

FIG. 2 is a schematic drawing illustrating alternate circuitry for adapting the apparatus in FIG. 1 for measurement of inductive reactance and loss.

Referring to FIG. 1, a sinewave generator 2 is connected to one of a pair of test terminals 1 via a first output 2a. The first output 2a is also connected to one fixed contact of a transfer switch 3. A second output 2b is connected to the other fixed contact of the transfer switch 3. The other of the pair of test terminals 1 is connected to the input of an operational amplifier 10. A resistance 11 is connected between the output and the input of the operational amplifier 10 via a pair of test terminals 1a. A sample having a capacitance and a parallel resistance, representing the capacitance and the conductance of the dielectric in a capacitor, is shown connected across the pair of test terminals 1. The sample could of course be any element for which the capacitive reactance and loss characterstics are to be determined. One side of each of a pair of switches 20a and 20b in this case metal oxide silicon field effect transistors (MOSFET), is connected to the output of the operational amplifier 10. The other side of the switch 20a is connected to the input of an operational amplifier 30, via a resistor 31, and to ground via a resistor 23a. A resistor 32 is connected between the input and the output of the operational amplifier 30. The output of the operational amplifier 30 is connected to the input of an operational amplifier 40 via a resistor 41a. The other side of the switch 20b is connected to the input of the operational amplifier 40 via a resistor 41b and to ground via a resistor 23b. The resistor 23a and 23b are closely matched in resistance as likewise are the resistors 41a and 41b.

A capacitor 42 is connected between the input and the output of the operational amplifier 40. One side of a switch 43, in this case a junction field effect transistor (JFET), is connected to the input of the operational amplifier 40 and the other side of the switch 43 is connected to the operational amplifier 40 via a resistor 44.

A switch 50, in this case a JFET, is connected between the output of the operational amplifier 40 and one end of a capacitor 53, the other end of the capacitor 53 connected to ground. A pair of high input impedance amplifying devices, that is MOSFETs 54 and 55, each have source, drain and gate electrodes labelled S, D and G respectively. The gate electrode G, of the MOSFET 54, is connected to the one end of the capacitor 53. The drain electrodes D, of the MOSFETs 54 and 55, are connected to a positive voltage terminal 56. The source electrodes S, of the MOSFETs 54 and 55, are each connected to a negative voltage terminal 59 via a pair of matched resistors 57 and 58 respectively. The source electrodes S, of the MOSFETs 54 and 55, are also connected to the non-inverting and inverting inputs of a differential amplifier 60, respectively. The output of the differential amplifier 60 is connected to the gate electrode G of the MOSFET 55 and to a voltage indicator 80.

Referring to FIG. 2, the circuit adaptation for measuring inductive reactance and loss includes a resistor 2c connected between the first output 2a and the input of the operational amplifier 10 via the pair of test terminals 1. A smaple having an inductance and a series resistance, representing the inductance and the electrical resistance in an inductor is shown connected across the pair of test terminals 1a. The sample, in this case, could of course by any element for which inductive reactance and loss characteristics are to be determined.

The preceding has described the measuring portion of the embodiments which essentially provide the reactance and loss measurements. The remainder of the circuitry, described in the following paragraphs, provides timing an control functions essential to the operation of the measuring portion.

A push to make start switch 5 is connected between a positive voltage +V and the input of a monostable multivibrator or one shot 70. The output of the one shot 70 is connected to the input of an inverter 71, to the reset input of a four stage or divide by eight counter 75 and to the control electrode of the JFET 43. The output of the inverter 71 is connected to the input of a one shot 72, the output of which is connected to the reset input of a flip flop 73.

The input of a zero crossing detector 4 is connected to the moveable contact of the transfer switch 3. The output of the zero crossing detector 4 is connected to the set input of the flip flop 73 and to an input of a NOR gate 22a. The output from the set side of the flip flop 73 is connected to the reset input of a flip flop 74. The output from the set side of the flip flop 74 is connected to another input of the NOR gate 22a and to an input of a NOR gate 22b. The output of the NOR gate 22a is connected to another input of the NOR gate 22b, to the counting input of the counter 75 and via a resistor 21a to the control electrode of the MOSFET 20a. The output of the NOR gate 22b is connected to the control electrode of the MOSFET 20b via a resistor 21b. The most significant output of the counter 75 is connected to the set input of the flip flop 74. The output of the set side of the flip flop 74 is also connected to the control electrode of the JFET 50 via a capacitor 51. A resistor 52 is connected between ground and the control electrode of the JFET 50.

Generally in operation an alternating voltage is applied across the sample and a voltage proportional to a current flow through the sample is generated. The proportional voltage is synchronously rectified with reference to the alternating voltage and the rectified voltage is integrated between time limits as determined by the alternating voltage. To calibrate the apparatus a standard known sample is used which establishes a linear ratio between the reactance or loss measurement required and the integrated voltage output indicated.

Basically, the elements in FIG. 1 identified by numerals 20a through 44 inclusive provide the required synchronous rectifier and integrator. The basic function of the integrator is to integrate a synchronously rectified signal and to produce an analog voltage representative of the integral at a precisely determined time after the elapse of an arbitrary but preset number of whole cycles of the signal to be measured. The number of cycles during which a measurement is performed may be as little as one. This however necessitates very accurate timing control of the synchronous rectifier and the integrator.

Ideally the example embodiment performs the following mathematically expressed operation:

$$E_{out} = \int_{\omega t=\epsilon}^{\omega t=\epsilon+\pi} E_{in} dt - \int_{\omega t=\epsilon+\pi}^{\omega t=\epsilon+2\pi} E_{in} dt$$

Where $E_{in}$ and $E_{out}$ are the input and output voltage respectively, and the integrations limits are related to a reference signal, $E_r = E \sin \omega t$. If the signal from the generator 2 includes a fundamental $\omega$; second and third harmonics B and C respectively; all related in phase to the reference signal $E_r$, plus a d.c. component D; the signal may be expressed as:

$E_{in} = A \sin(\omega t+\phi) + B \sin(2n\omega t+\theta) + C \sin[(2n+1)\omega t+\lambda] + D$ where $n$ is the order of the harmonic and $\phi$ and $\lambda$ represent phase shift in relation to $E_r$. Substituting this expression for $E_{in}$ in the first equation and solving provides the following equation:

$$E_{out} = 4A/\omega \cos(\epsilon+\phi)+[4B/(2n+1)\omega]\cos[(2n+1)\epsilon+\lambda]$$

Thus it can be seen that the integrator eliminates all even harmonics as well as the d.c. component, and reduces the amplitude of the odd harmonics by a factor equal to their order.

Considering the fundamental only:

$E_{out} = 4A/\omega \cos\phi$     when $\epsilon=0$ and $E_{out} = -4A/\omega \sin\phi$     when $\epsilon=\pi/2$ When $\epsilon=0$ or $\epsilon=\pi/2$ the synchronous rectifier and the integrator are controlled in phase or in quadrature with the reference signal respectively. When in phase control is required, to provide a reactance measurement, $E_r$ is supplied to the zero crossing detector 4 from the terminal 2a, via the switch 3. When a quadrature control is required, to provide a conductance or loss measurement, $E_r$, phase shifted by 90°, is supplied from the terminal 26, via the transfer switch 3 to the zero crossing detector 4.

More specifically, in the operation of the sample embodiment, the sinewave generator 2 provides an alternating signal $E_r$ at the frequency at which the sample is to be measured. In the circuit operation in the measurement of capacitive reactance and loss, the sample to be measured is connected across the pair of test terminals 1. The combination of the operational amplifier 10 and the resistor 11 provides a current to voltage converter. A virtual ground exists at the input of the amplifier 10 and thus a voltage ($E_{in}$) proportional to the current flow through the sample appears at the output of the amplifier 10. In the measurement of inductive reactance and loss, the sample to be measured is connected across the pair of test terminals 1a. The terminals 1a are effectively a current source due to the combination of the operational amplifier 10 and the resistor 2c. One end of the sample is effectively grounded by the virtual ground at the input of the amplifier 10. Thus a voltage ($E_{in}$) proportional to the electromotive force generated by the current flowing in the sample appears at the output of the amplifier 10. The signal $E_r$ is supplied to the zero crossing detector which produces a squarewave signal at its output, the transient portion of the signal being coincident with the zero crossing points of the signal $E_r$. The squarewave signal provides a timing control function to the NOR gates 22a and 22b which when enabled operate the MOSFETs 20a and 20b respectively.

To start the measuring process in the apparatus, the start switch is momentarily actuated to switch the one shot 70 into its unstable state. Thus a positive reset pulse is d.c. coupled to the counter 75 to set its count at zero. The positive reset pulse also switches the JFET 43 ON for the duration of the pulse. Any charge on the capacitor 42 is removed via the JFET 43 and the resistor 44. The resistor 44 serves to limit the current through the JFET 43. In addition the positive pulse appears as a negative pulse at the output of the inverter 71.

When the one shot 70 returns to its stable state, the one shot 72 is a.c. positive actuated to switch into its unstable state. The output from the one shot 72 resets the flip flop 73 and maintains the reset condition until the one shot 72 returns to its stable state. Thereafter the first positive going edge from the zero crossing detector sets the flip flop 73 which in turn resets the flip flop 74 and enables the NOR gates 22a and 22b to switch the MOSFETs 20a and 20b. The MOSFETs 20a and 20b, the amplifier 30 and the associated resistor 23a, 23b, 31 and 32, provide a rectifier which is controlled to synchronously rectify the output voltage from the amplifier 10. The NOR gates 22a and 22b provide complementary drive signals to the control electrodes of the MOSFETs 20a and 20b such that they are alternately switched on during alternate halves of the reference signal $E_r$. The resistors 23a and 23b provide equalized loading of the output of the amplifier 10.

When the switch 20a is on, the proportional voltage from the amplifier 10 is inverted by the amplifier 30 the gain of which is established ideally at one by the values of the resistors 31 and 32. Hence a synchronously rectified signal is applied via the resistors 41a and 41b to the input of the amplifier 40. The amplifier 40 in combination with the capacitor 42 and the resistors 41a and 41b integrates the synchronously rectified voltage, in a well known manner.

The output of the NOR gate 22a is counted by the divide by eight counter 75. When a count of four is reached, the output of the counter sets the flip flop 74 which inhibits further rectification of the proportional voltage. Simultaneously, a positive strobe pulse is developed by the differentiating network of the capacitor 51 and the resistor 52. The strobe pulse momentarily switches the JFET 50 ON so that the capacitor 53 is charged to the voltage potential at the output of the amplifier 40. Thus the output voltage of the amplifier 40, i.e. the value of the integral, is sampled and held.

The MOSFETs 54 and 55 in combination with the differential amplifier 60 act as a buffer between the stored voltage on the capacitor 53 and the indicator 80. The MOSFET 54 acts as a source follower with the voltage at its source terminal determined by the voltage at its gate electrode G. The MOSFET 55 adjusts the gain of the amplifier 60 to 1 and also in combination with the resistor 58 provides a matched or balanced input to the differential input of the amplifier 60. The MOSFETs 54 and 55 are preferably closely matched devices and could advantageously be provided on a common substrate or chip. The sample and hold circuit is endowed with a high degree of temperature stability as the MOSFETs 54 and 55 being so similar experience similar variations with respect to temperature and so maintain an almost ideal balanced condition at the inputs of the amplifier 60.

The example embodiment as above-described operates to provide a synchronous integration over four cycles of the reference voltage. Fewer cycles may be used, however, error due to random noise will increase somewhat. The use of four cycles appears to be a reasonable compromise in speed when very precise accuracy is required.

An apparatus similar to that in FIGS. 1 and 2 has been constructed with the addition of switching selections for a user's convenience. For example, in FIG. 1 the selections provide optiona gains by inserting different resistance values for the resistor 11 in the feedback path around the amplifier 10. Switching selections were also provided for different values of the capacitor 42. The switching selections extend the measurement range of the apparatus. In order to obtain the best precision a fine gain adjustment may be added to the amplifier 30 so that balanced signal paths are provided via the switches 20a and 20b. Further, a balancing potentiometer may be added between the resistors 57 and 58 and the negative voltage terminal 59, to precisely balance the inputs of the amplifier 60.

In a practical embodiment some active devices found to be suitable are tabulated in the following list:

amplifier 10 — ANALOG DEVICES 223-K
amplifier 30 — ANALOG DEVICES 223-K
amplifier 40 — ANALOG DEVICES 223-K
switch 20a — 2N3796
switch 20b — 2N3796
amplifier 54 — 2N3796
amplifier 55 — 2N3796
amplifier 60 — 741C
switch 43 — 2N5457
switch 50 — 2N5457

It should be noted that the JFET type of device was found to be particularly suitable for the switches 43 and 50, as this type of device is virtually infinite in resistance when turned OFF.

The example embodiment was constructed with the intent of maximizing the low frequency measurement advantages in the invention. For versatility it is desirable to extend the frequency range of the apparatus in the upward direction. It is envisioned that with proper component selection a circuit similar to that shown in the drawings will function at frequencies well in excess of 1 MHz.

The apparatus may be used as a phase sensitive voltmeter whereby in phase and quadrature components of an unknown alternating electrical signal may be determined with respect to a reference signal. To use the apparatus as a phase sensitive voltmeter, a standard virtually loss less known capacitor is connected in place of the sample in FIG. 1 and if desired the calibration of the apparatus can be checked with a known a.c. voltage standard, for example the generator 2. The voltage source to be measured is connected in place of the generator 2 however in this case the input of the zero crossing detector 4 is connected to the reference signal source for measurement of the in phase vector. For measurement of the quadrature vector the reference signal supplied to the zero crossing detector must be shifted in phase by 90°. The apparatus is operated as before described for capacitance measurement and loss measurement to obtain an indication of the magnitude of in phase and quadrature phase vectors.

In the measurement of very low losses, significant error is introduced by slight timing deviations, from the ideal, in the control portion of the circuit. This may be particularly evident for example when the capacitance phase is very large in relation to the loss phase. Most of the error can be eliminated by connecting a standard low loss capacitor between the voltage on the output 2a shifted by 180° and the input of the amplifier 10. Hence the capacitance phase is substantially bucked out or reduced in magnitude, thereby introducing far less error into the quadrature, i.e. loss, measurement.

What is claimed is:

1. A measurement apparatus for providing an indication of the electrical reactance and loss characteristics of an element, comprising:
    means for applying an alternating electrical signal to the element and deriving therefrom a voltage signal having a phase and magnitude relationship with respect to the electrical signal according to the reactance and loss characteristics of the element;
    means for rectifying the voltage signal, during the period of one full cycle of the alternating electrical signal, the rectifying means being switched in synchronism with the alternating electrical signal;
    means for integrating the rectified voltage signal, the magnitude of the integral at the end of said period being an indication of one of said characteristics.

2. An apparatus as defined in claim 1 intended for capacitive reactance measurement and loss measurement and in which the means for applying and deriving comprises:
    an alternating voltage source connected across the element;
    means for generating a voltage signal proportional to the current flow in the element;
    and in which the rectifying means is synchronized with the alternating voltage source.

3. An apparatus as defined in claim 2 in which the rectifying means is switched coincident with the zero crossings of the alternating voltage from the alternating voltage source, to obtain an indication of the capacitive reactance characteristic, and is switched coincident with a point 90° removed from the zero crossings to obtain an indication of the loss characteristic.

4. An apparatus as defined in claim 2 in which the period, over which the rectifying and integrating means operate, extends over a plurality of full cycles of the alternating voltage from the alternating voltage source, whereby measurement error resulting from odd order harmonics in the alternating voltage is reduced in relation to the number of full cycles in the plurality.

5. An apparatus as defined in claim 1, intended for inductive reactance measurement and loss measurement and in which, the means for applying and deriving comprises:
    an alternating current source connected across the element;
    means for generating a voltage signal proportional to the voltage across the element;
    and in which the rectifying means is synchronized with the alternating current source.

6. An apparatus as defined in claim 5 in which the rectifying means is switched coincident with the zero crossings of the alternating current, from the alternating current source, to obtain an indication of the inductive reactance characteristic and is switched coincident with a point 90° removed from the zero crossings to obtain an indication of the loss characteristic.

7. An apparatus as defined in claim 5 in which the period over which the rectifying an integrating means operate, extends over a plurality of full cycles of the alternating current from the alternating current source, whereby measurement error resulting from odd order harmonics in the alternating current is reduced in relation to the number of full cycles in the plurality.

8. A method for obtaining an indication of the electrical reactance and loss characteristics of an element, comprising the steps of:
    a. applying an alternating electrical signal to the element and deriving therefrom a voltage signal having a magnitude and phase relationship with respect to the alternating electrical signal according to the reactance and loss characteristics of the element;
    b. rectifying the voltage signal in synchronism with the alternating electrical signal during the period of one full cycle of the alternating electrical signal;

c. integrating the rectified voltage signal, the magnitude of the integral at the end of said period being an indication of one of said characteristics.

9. A method as defined in claim 8 in which the alternating electrical signal is a alternating voltage, whereby the indications obtained are of capacitive reactance and loss characteristics.

10. A method as defined in claim 9 in which the step (b) is synchronized coincident with the zero crossings of the alternating voltage to obtain an indication of the capacitive reactance characteristic, and is synchronized coincident with a point 90° removed from te zero crossings of the alternating voltage to obtain an indication of the loss characteristic.

11. A method as defined in claim 9 in which step (c) extends over the sum of the periods of a plurality of full cycles of the alternating voltage, whereby measurement error resulting from odd order harmonics in the alternating voltage is reduced in proportion to the number of the full cycles in the plurality.

12. A method as defined in claim 8 in which the alternating electrical signal is an alternating current whereby the indications obtained are of inductive reactance and loss characteristics.

13. A method as defined in claim 12 in which the step (b) is synchronized coincident with the zero crossings of the alternating current to obtain an indication of the inductive reactance characteristic, and is synchronized coincident with a point 90° removed from the zero crossings of the alternating current to obtain an indication of the loss characteristic.

14. A method as defined in claim 12 in which step (c) extends over the sum of the periods of a plurality of full cycles of the alternating current, whereby measurement error resulting from odd order harmonics in the alternating current is reduced in proportion to the number of the full cycles in the plurality.

* * * * *